(12) United States Patent
Xu et al.

(10) Patent No.: US 12,160,757 B2
(45) Date of Patent: Dec. 3, 2024

(54) METHOD AND DEVICE FOR INFORMATION TRANSMISSION

(71) Applicant: GUANGDONG OPPO MOBILE TELECOMMUNICATIONS CORP., LTD., Dongguan (CN)

(72) Inventors: Yang Xu, Dongguan (CN); Haorui Yang, Dongguan (CN); Jianhua Liu, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 349 days.

(21) Appl. No.: 17/564,523

(22) Filed: Dec. 29, 2021

(65) Prior Publication Data

US 2022/0124521 A1    Apr. 21, 2022

Related U.S. Application Data

(63) Continuation of application No. PCT/CN2019/109688, filed on Sep. 30, 2019.

(51) Int. Cl.
*H04W 84/04* (2009.01)
*H04M 3/00* (2024.01)
(Continued)

(52) U.S. Cl.
CPC .......... *H04W 24/02* (2013.01); *H04W 28/09* (2020.05); *H04W 84/042* (2013.01)

(58) Field of Classification Search
CPC ..... H04W 48/18; H04W 48/16; H04W 60/00; H04W 84/042; H04W 8/24; H04W 8/183;
(Continued)

(56) References Cited

U.S. PATENT DOCUMENTS

2011/0269460 A1    11/2011  Dalsgaard et al.
2018/0324879 A1    11/2018  Lecroart et al.
(Continued)

FOREIGN PATENT DOCUMENTS

CN        1942011 A       4/2007
CN      101646248 A       2/2010
(Continued)

OTHER PUBLICATIONS

Extended European Search Report dated May 9, 2022 received in European Patent Application No. EP 19947722.5.
(Continued)

*Primary Examiner* — Kharye Pope

(74) *Attorney, Agent, or Firm* — Sheppard, Mullin, Richter & Hampton LLP

(57) ABSTRACT

The present disclosure discloses a method and a device for information transmission, capable of enabling a terminal device to efficiently identify a network to which identification information it receive is to be applied. The method includes: receiving, by a terminal device, identification information transmitted by a network device; and determining, by the terminal device, whether the identification information is to be used in a non-public network based on an indication from the network device, an environment in which the identification information is received, or content of the identification information.

12 Claims, 8 Drawing Sheets

(51) Int. Cl.
*H04M 5/00* (2006.01)
*H04W 24/02* (2009.01)
*H04W 28/08* (2023.01)

(58) Field of Classification Search
CPC ..... H04W 36/08; H04W 88/06; H04W 48/20; H04W 84/045; H04M 15/66; H04M 1/72454; H04M 7/006; H04M 15/8038
See application file for complete search history.

(56) References Cited

U.S. PATENT DOCUMENTS

| | | | | |
|---|---|---|---|---|
| 2020/0267634 A1* | 8/2020 | Kim | ............... | H04W 48/16 |
| 2020/0329422 A1* | 10/2020 | Sirotkin | ............... | H04W 48/18 |
| 2021/0014912 A1* | 1/2021 | Song | ............... | H04W 48/16 |
| 2021/0092708 A1* | 3/2021 | Ryu | ............... | H04W 76/27 |
| 2021/0219355 A1* | 7/2021 | Lindheimer | ......... | H04W 76/11 |
| 2021/0297937 A1* | 9/2021 | Baek | ............... | H04W 48/12 |
| 2022/0007274 A1* | 1/2022 | Jin | ............... | H04W 48/10 |
| 2022/0053452 A1* | 2/2022 | Geng | ............... | H04W 68/005 |
| 2022/0167260 A1* | 5/2022 | Chun | ............... | H04W 48/18 |
| 2022/0201482 A1* | 6/2022 | Ferdi | ............... | H04L 9/0891 |
| 2022/0225272 A1* | 7/2022 | Yang | ............... | H04W 68/02 |
| 2022/0272620 A1* | 8/2022 | Ninglekhu | ......... | H04W 48/18 |

FOREIGN PATENT DOCUMENTS

| | | |
|---|---|---|
| CN | 103503380 A | 1/2014 |
| CN | 104471885 A | 3/2015 |
| CN | 104782205 A | 7/2015 |
| CN | 104871600 A | 8/2015 |
| CN | 106211311 A | 12/2016 |
| CN | 106488538 A | 3/2017 |
| CN | 106572507 A | 4/2017 |
| CN | 107409437 A | 11/2017 |
| CN | 108738104 A | 11/2018 |
| CN | 109644516 A | 4/2019 |
| CN | 109862581 A | 6/2019 |
| CN | 110166928 A | 8/2019 |
| CN | 110213808 A | 9/2019 |
| EP | 2117252 A1 | 11/2009 |
| WO | 2009132587 A1 | 11/2009 |
| WO | 2017063445 A1 | 4/2017 |

OTHER PUBLICATIONS

"3rd Generation Partnership Project; Technical Specification Group Core Network and Terminals; 5G System; UE Policy Control Service; Stage 3 (Release 16)", 3GPP Standard; Technical Specification; 3GPP TS 29.525, 3rd Generation Partnership Project (3GPP), Mobile Competence Centre 650, Route Des Lucioles; F-06921 Sophia-Antipolis Cedex; France,No. V16. 1. 0 Sep. 27, 2019 (Sep. 27, 2019), pp. 1-46, XP051785018.

First Office Action from corresponding Chinese Application No. 202110973632.6, dated Dec. 1, 2022 . English translation attached.

The Second Office Action from corresponding Chinese Application No. 202110973632.6, dated Jan. 18, 2023 . English translation attached.

Communication pursuant to Article 94(3) EPC for European application 19947722.5 mailed Feb. 9, 2023.

The Rejection Decision from corresponding Chinese Application No. 202110973632.6, dated Mar. 31, 2023. English translation attached.

Examination Report-Communication pursuant to Article 94(3) EPC dated Jul. 14, 2021 received in European Patent Application No. EP 19947722.5.

3rd Generation Partnership Project, "3GPP TR 33.819 V1.1.0 Study on Security for 5GS Enhanced Support of Vertical and LAN Services", Jun. 30, 2019, Part 6.

3rd Generation Partnership Project, Technical Specification Group Services and System Aspects, "3GPP TS 23.501 V16.2.0 System Architecture for the 5G System (5GS)", Sep. 2019, Stage 2 (Release 16).

International Search Report and Written Opinion dated Jun. 30, 2020 in International Application No. PCT/CN2019/109688. English translation is attached.

* cited by examiner

METHOD AND DEVICE FOR INFORMATION TRANSMISSION

CROSS-REFERENCE TO RELATED APPLICATIONS

The present application is a continuation of International Application No. PCT/CN2019/109688 filed on Sep. 30, 2019, which is hereby incorporated by reference in its entirety.

TECHNICAL FIELD

The embodiments of the present disclosure relates to the field of communication technology, and more particularly, to a method for information transmission.

BACKGROUND

Terminal devices can transmit data through public networks, such as a Public Land Mobile Network (PLMN), and support data transmission in Non-Public Networks (NPNs). Therefore, a terminal device needs to identify whether identification information it receives is to be used in a public network or a non-public network, so as to achieve efficient communication of the terminal device in the corresponding network.

SUMMARY

The present disclosure provides a method and a device for information transmission, capable of enabling a terminal device to efficiently identify a network to which identification information it receive is to be applied.

In a first aspect, a method for information transmission is provided. The method includes: receiving, by a terminal device, identification information transmitted by a network device; and determining, by the terminal device, whether the identification information is to be used in a non-public network based on an indication from the network device, an environment in which the identification information is received, or content of the identification information.

In a second aspect, a method for information transmission is provided. The method includes: transmitting, by a network device, identification information to a terminal device; and indicating, by the network device, to the terminal device whether the identification information is to be used in a non-public network.

In a third aspect, a terminal device is provided. The terminal device is configured to perform the method according to the above first aspect or any optional embodiments thereof. In particular, the terminal device includes functional units for performing the method according to the above first aspect or any optional embodiments thereof.

In a fourth aspect, a network device is provided. The network device is configured to perform the method according to the above second aspect or any optional embodiments thereof. In particular, the network device includes functional units for performing the method according to the above second aspect or any optional embodiments thereof.

In a fifth aspect, a terminal device is provided. The terminal device includes a processor and a memory. The memory is configured to store a computer program, and the processor is configured to invoke and execute the computer program stored in the memory to perform the method according to the above first aspect or any optional embodiments thereof.

In a sixth aspect, a network device is provided. The network device includes a processor and a memory. The memory is configured to store a computer program, and the processor is configured to invoke and execute the computer program stored in the memory to perform the method according to the above second aspect or any optional embodiments thereof.

In a seventh aspect, an apparatus for information transmission is provided. The apparatus includes a processor. The processor is configured to invoke and execute a computer program from a memory to cause a device provided with the apparatus to perform the method according to the above first aspect or any optional embodiments thereof. The apparatus is for example a chip.

In an eighth aspect, an apparatus for information transmission is provided. The apparatus includes a processor. The processor is configured to invoke and execute a computer program from a memory to cause a device provided with the apparatus to perform the method according to the above second aspect or any optional embodiments thereof. The apparatus is for example a chip.

In a ninth aspect, a computer readable storage medium is provided. The computer readable storage medium stores a computer program that causes a computer to perform the method according to the above first aspect or any optional embodiments thereof.

In a tenth aspect, a computer readable storage medium is provided. The computer readable storage medium stores a computer program that causes a computer to perform the method according to the above second aspect or any optional embodiments thereof.

In an eleventh aspect, a computer program product is provided. The computer program product includes computer program instructions that cause a computer to perform the method according to the above first aspect or any optional embodiments thereof.

In a twelfth aspect, a computer program product is provided. The computer program product includes computer program instructions that cause a computer to perform the method according to the above second aspect or any optional embodiments thereof.

In a thirteenth aspect, a computer program is provided. The computer program, when executed on a computer, causes the computer to perform the method according to the above first aspect or any optional embodiments thereof.

In a fourteenth aspect, a computer program is provided. The computer program, when executed on a computer, causes the computer to perform the method according to the above second aspect or any optional embodiments thereof.

In a fifteenth aspect, a communication system is provided. The communication system includes a terminal device and a network device. The network device is configured to: transmit identification information to the terminal device; and indicate to the terminal device whether the identification information is to be used in a non-public network. The terminal device is configured to: receive the identification information transmitted by the network device; and determine whether the identification information is to be used in the non-public network based on an indication from the network device, an environment in which the identification information is received, or content of the identification information.

With the above solutions, the terminal device can determine whether the identification information it receives is to be used in the non-public network based on the indication from the network device, the environment in which the identification information is received, or the content of the identification information, such that the terminal device can communicate efficiently in the corresponding network.

DESCRIPTION OF EMBODIMENTS

The technical solutions in the embodiments of the present disclosure will be described below with reference to the figures.

The technical solutions according to the embodiments of the present disclosure can be applied to various communication systems, including for example: Global System of Mobile Communication (GSM), Code Division Multiple Access (CDMA) system, Wideband Code Division Multiple Access (WCDMA) system, Long Term Evolution (LTE) system, LTE Frequency Division Duplex (FDD) system, LTE Time Division Duplex (TDD) system, Advanced Long Term Evolution (LTE-A) system, New Radio (NR) system, evolved NR system, LTE-based access to unlicensed spectrum (LTE-U) system, NR-based access to unlicensed spectrum (NR-U) system, Universal Mobile Telecommunication System (UMTS), Wireless Local Area Networks (WLAN), Wireless Fidelity (WiFi), 5G system, or other communication systems.

Generally, traditional communication systems can support a limited number of connections and are easy to implement. However, with the development of communication technology, mobile communication systems can support not only traditional communication, but also e.g., Device to Device (D2D) communication, Machine to Machine (M2M) communication, and Machine Type Communication (MTC), Vehicle to Vehicle (V2V) communication, etc. The embodiments of the present disclosure can also be applied to these communication systems.

In addition, the communication system of an embodiment of the present disclosure may be applied to a Carrier Aggregation (CA) scenario, a Dual Connectivity (DC) scenario, a Standalone (SA) network deployment scenario, and the like.

Figure 1:
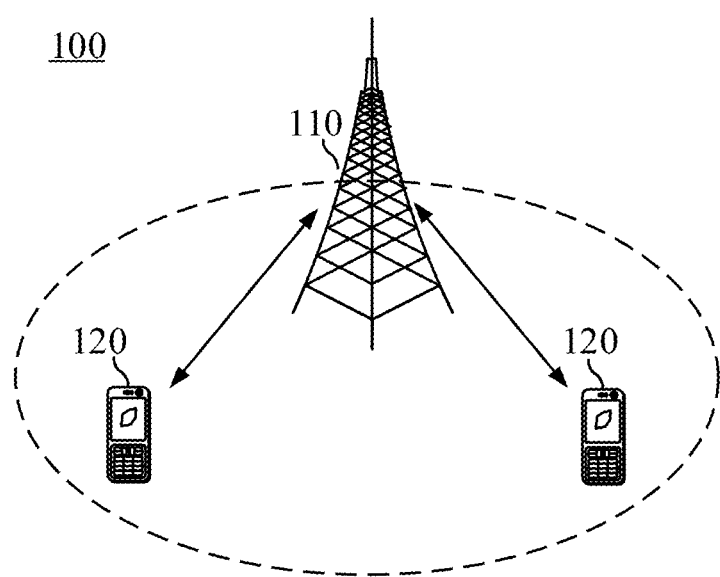
FIG. 1 is a schematic diagram showing a possible wireless communication system in which an embodiment of the present disclosure.

For example, a communication system 100 where an embodiment of the present disclosure can be applied is shown in FIG. 1. The communication system 100 includes a network device 110. The network device 110 may be a device that can communicate with the terminal device 120. The network device 110 may provide communication coverage for a particular geographic area, and may communicate with terminal devices located in the coverage area.

In an embodiment of the present disclosure, the network device 110 may be, for example, a base station such as Base Transceiver Station (BTS) in a GSM system or a CDMA system, a base station such as NodeB (NB) in a WCDMA system, a base station such as Evolutional Node (eNB or eNodeB) in an LTE system, or a radio controller in a Cloud Radio Access Network (CRAN). Alternatively, the network device 110 may be a mobile switching center, a relay station, an access point, a vehicle-mounted device, a wearable device, a hub, a switch, a bridge, a router, a network device in a 5G network, or a network device in a future evolved Public Land Mobile Network (PLMN), or the like. Alternatively, the network device 110 may also be a satellite in an NTN system.

The communication system 100 further includes at least one terminal device 120 located within the coverage range of the network device 110. The terminal device 120 may be mobile or stationary. The terminal device 120 may be, for example, a User Equipment (UE), an access terminal, a user unit, a user station, a mobile station, a remote station, a remote terminal, a mobile device, a user terminal, a terminal, a wireless communication device, a user agent, or a user device. Alternatively, the terminal device can be a cellular phone, a cordless phone, a Session Initiation Protocol (SIP) phone, a Wireless Local Loop (WLL) station, a Personal Digital Assistant (PDA), a handheld device or a computing device having a wireless communication function, another processing device connected to a wireless modem, a vehicle-mounted device, a wearable device, a terminal device in a future 5G network, or a terminal device in a future evolved PLMN, etc. The embodiment of the application is not limited to any of these examples. In addition, direct communication, such as Device to Device (D2D) communication, may be performed between the terminal devices 120.

The network device 110 may provide services for a cell, and the terminal device 120 may communicate with the network device 110 over transmission resources corresponding to the cell. The cell may be a cell corresponding to the network device 110. The cell may belong to a macro base station or a base station corresponding to a small cell. The small cell here may include a metro cell, a micro cell, a pico cell, a femto cell, or the like. These small cells have characteristics such as small coverage and low transmission power, and are suitable for providing high-rate data transmission services.

FIG. 1 exemplarily shows one network device and two terminal devices, but the present disclosure is not limited to this. The communication system 100 may include multiple network devices, and the coverage of each network device may include other numbers of terminal devices. In addition, the communication system 100 may also include other network entities such as a network controller and a mobility management entity.

At present, a terminal device can perform data services via a PLMN. However, in some scenarios, such as office scenarios, home scenarios, and factory scenarios, in order to achieve more effective security management, there may be local networks or private networks deployed by local users or managers.

For the above-mentioned vertical industries, a possible deployment is Non-Public Network (NPN). That is, an operator's proprietary network or a third-party's own network can be used to serve some specific users. Unlike the PLMN, access to the NPN is limited to particular users, and interoperation behaviors between the NPN and the PLMN will be constrained. For example, the terminal device cannot be handed over or cell reselected from the NPN to the PLMN. Especially for a Standalone NPN (SNPN), which has strong independence itself, different terminal policies may be required on different NPNs.

Figure 2:
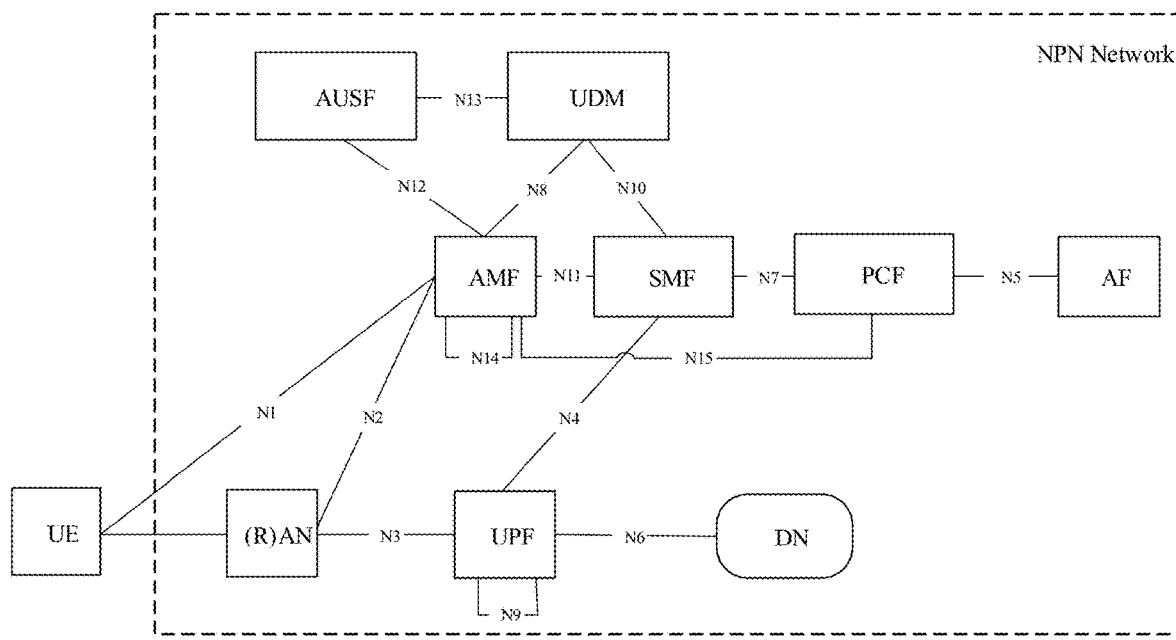
FIG. 2 is a schematic diagram showing a 5G network architecture supporting an NPN.

FIG. 2 shows a 5G network architecture supporting an NPN.

Here, a Radio Access Network (RAN) may be a 3GPP access network, such as a base station, or a non-3GPP access network. It is mainly used for functions such as radio resource management, uplink and downlink data classification and Quality of Service (QoS) applications, cooperation with control plane network elements for signaling processing, and cooperation with user plane network elements for data forwarding.

Access and Mobility Management Function (AMF) is configured to provide functions such as termination of a control plane of a radio access network, termination of non-access signaling, mobility management, lawful interception, and access authorization/authentication.

Session Management Function (SMF) is configured to provide functions such as session management, Internet Protocol (IP) address allocation and management for UEs, selection of user plane functions to be managed, termination of policy control and charging function interfaces, and downlink data notification.

User Plane Function (UPF) is configured to provide functions such as packet routing and forwarding, and QoS processing of user plane data.

Unified Data Management (UDM) is configured to provide functions such as generation of 3GPP authentication certificates/authentication parameters, storage and management of permanent user identification of a 5G system, and subscription information management.

Policy Control Function (PCF) is mainly configured to provide parameters related to terminal policies, access and mobility management policies, and session management policies to terminal devices, AMF, and SMF, respectively.

Application Function (AF) is a third-party application server and is configured to initiate transmission of multicast data.

Data Network (DN) is configured to transmit data to and receive data from networks such as Internet.

Authentication Server Function (AUSF) is configured to support authentication of 3GPP access and untrusted non-3GPP access.

Here, Ni represents a communication interface, where i is a positive integer. For example, N2 is the communication interface between RAN and AMF, N3 is the communication interface between RAN and UPF, N4 is the communication interface between SMF and UPF, and N6 is the communication interface between UPF and DN.

NPNs include SNPNs and CAG networks. Here, an SNPN is more closed, and generally does not support interoperability between the SNPN and a PLMN. For example, a terminal device cannot be handed over or cell reselected from the SNPN to the PLMN. A CAG network can support interoperability with a PLMN in some cases.

An identifier of an SNPN is composed of an identifier of a PLMN and a Network Identifier (NID). That is, SNPN ID=PLMN ID+NID. In other words, the identifier of the SNPN is identified by the PLMN ID and the NID.

A PLMN and an NPN may have the same PLMN ID, e.g., with a Mobile Country Code (MCC) of the PLMN ID set to 999. Therefore, a terminal device cannot identify whether identification information it receives is applicable to the PLMN or the NPN.

In the SNPN, each network element may exist independently of the PLMN. That is, the SNPN may have its own network elements such as PCF, SMF, AMF, UDM, etc., and may have its own root key, security algorithm, subscription information, policy information, and so on, so as to achieve isolation from the PLMN.

Since the SNPN has the same operation mechanism as that of the PLMN, this means that the AMF also needs to assign identification information to terminal devices, such as the Globally Unique Temporary Identifier (GUTI) and Tracking Area Identifier (TAI) list, for access and mobility management. However, since SNPN ID=PLMN ID+NID, the GUTI assigned in the NPN and the GUTI in the PLMN may coincide. After receiving the GUTI, the terminal device cannot determine whether the identification information in the GUTI is to be used in the PLMN or the NPN.

Figure 3:
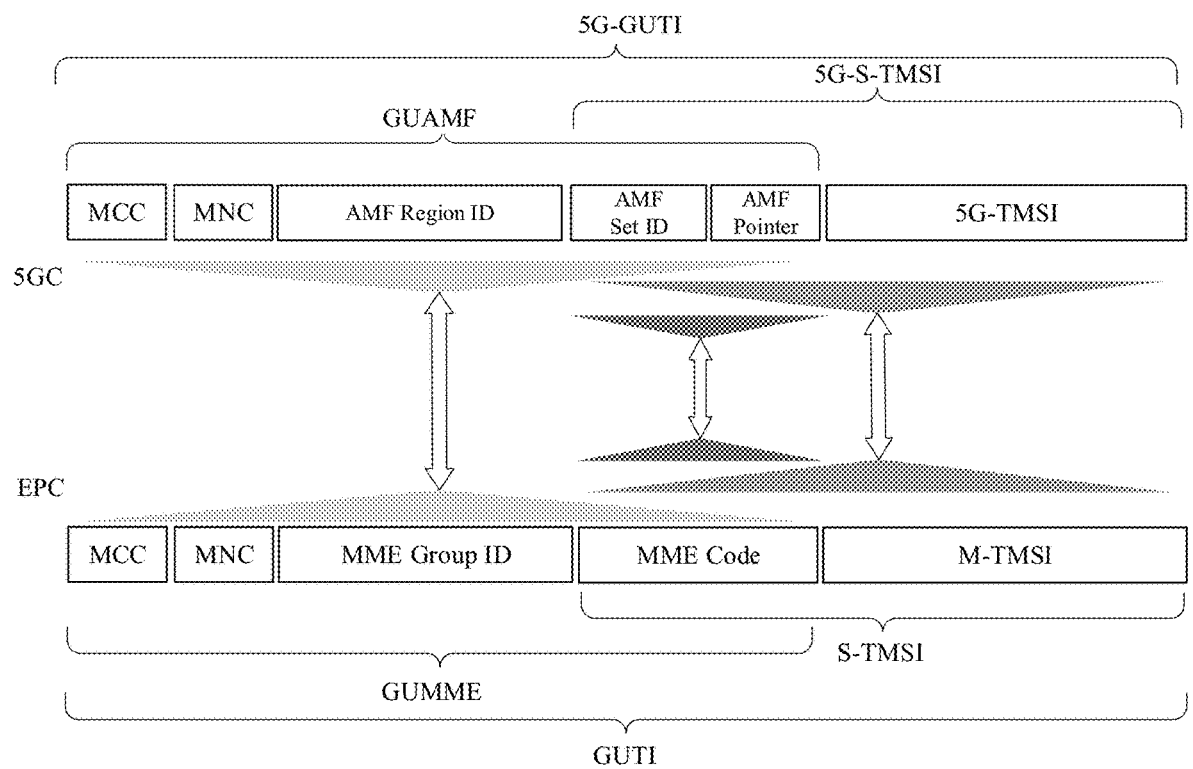
FIG. 3 is a schematic diagram showing a GUTI.

The PLMN ID is carried in the GUTI, e.g., in the embodiment shown in FIG. 3. The GUTI is a temporary identifier assigned to the terminal device from the network side, which is globally unique and can be replaced periodically or under certain conditions. The temporary identifier can effectively avoid interaction of a permanent identifier of the terminal device, such as Subscription Permanent Identifier (SUPI) and International Mobile Subscriber Identity (IMSI), thereby improving the security level.

FIG. 3 shows various fields included in a 5G-GUTI transmitted in a 5G system (5GS) and a GUTI transmitted in an Evolved Packet System (EPS). The upper row shows the fields corresponding to the 5G Core (5GC), and the lower row shows the fields corresponding to the EPC core network.

Here, the 5G-GUTI includes a PLMN ID, an AMF Region ID, an AMF Set ID, an AMF Pointer, and a 5G-Temporary Mobile Subscriber Identity (5G-TMSI). The PLMN ID, AMF Region ID, and AMF Set ID can be referred to as Globally Unique AMF Identity (GUAMF). The AMF Region ID, AMF Set ID, and 5G-TMSI can be referred to as 5G-S-TMSI.

The GUTI corresponding to the EPS includes a PLMN ID, a Mobility Management Entity (MME) Group ID, an MME Code, and an M-TMSI. Here, the PLMN ID, MME Group ID, and MME Code can be referred to as Globally Unique MME Identity (GUMMEI). The MME Group ID, MME Code, and M-TMSI can be referred to as S-TMSI.

As shown in FIG. 3, the PLMN ID includes a Mobile Country Code (MCC) and a Mobile Network Code (MNC). The PLMN ID can be transmitted to the terminal device in the GUTI. However, since the GUTI in the NPN and the GUTI in the PLMN are the same, the terminal device cannot efficiently identify whether the GUTI it receives is applicable to the NPN or the PLMN.

The same problem also exists in the TAI list and the UE Policy Section Identifier (UPSI).

Here, a TAI includes a PLMN ID and a Tracking Area Code (TAC), i.e., TAI=PLMN ID+TAC. Therefore, the terminal device cannot identify whether the TAI list transmitted by the AMF is to be used in the NPN or the PLMN.

For the UPSI, some of its values overlap in the NPN and in the PLMN. If the terminal device receives one of these values, it cannot identify whether the UE policy section content corresponding to the UPSI is applicable to a UE policy in the NPN or in the PLMN.

A core network element, such as PCF, can transmit a UE policy to the terminal device in a form of a container. When the core network element does not transmit the UE policy, or depending on a configuration at the terminal device, the terminal device can also choose to use a locally configured UE policy.

The transmission of the UE policy can be achieved through a UE Configuration Update (UCU) process. The PCF can put the policy to be updated in a container and transmit it to the AMF. The AMF can directly forward it to the terminal device via a NAS message.

The network side can divide the UE policy into one or more sections, each corresponding to an identifier, i.e., UPSI, so as to indicate the content of the corresponding UE policy section to the terminal device. The UPSI is composed of a PLMN ID and a Policy Section Code (PSC), i.e., UPSI=PLMN ID+PSC. The PSC can be unique in the network, and can be referred to as UPSC. However, the terminal device cannot identify, based on the PLMN ID, whether the content of the UE policy section corresponding to the UPSI is applicable to the UE policy in the NPN or in the PLMN.

To this end, the present disclosure provides a method for information transmission, which enables the terminal device to efficiently identify the network to which identification information it receives is applicable, thereby solving the problem of conflict between identification information in a public network and identification information in a non-public network.

Figure 4:
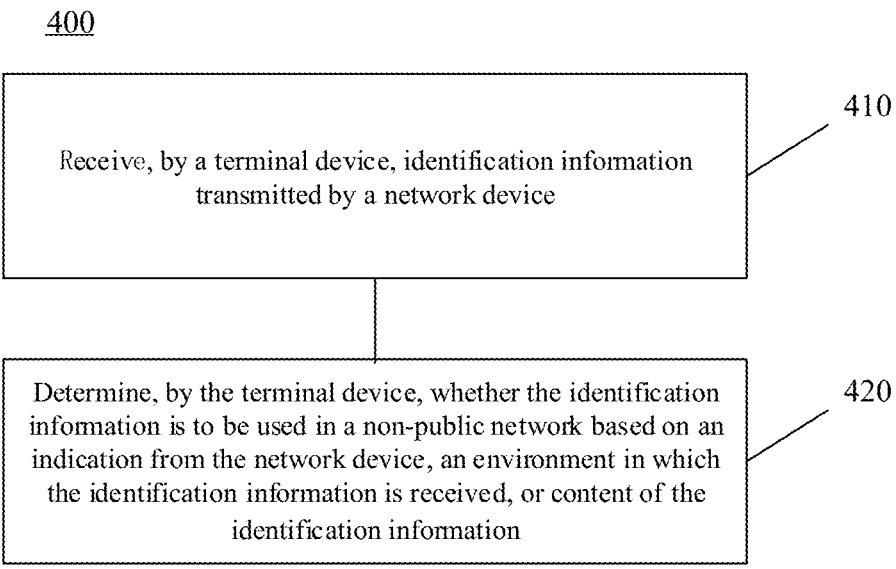
FIG. 4 is a flowchart illustrating a method for information transmission according to an embodiment of the present disclosure.

FIG. 4 is a schematic flowchart illustrating a method for information transmission according to an embodiment of the present disclosure. The method 400 can be applied to a non-public network in 5G or a non-public network in 4G.

In the embodiment shown in FIG. 4, the method 400 includes some or all of the following steps.

At 410, a terminal device receives identification information transmitted by a network device.

At 420, the terminal device determines whether the identification information is to be used in a non-public network based on an indication from the network device, an environment in which the identification information is received, or content of the identification information.

Here, the identification information may include, for example, at least one of: a GUTI, a TAI, and a UPSI.

For the UPSI, when the terminal device determines that the UPSI is to be used in the non-public network, it can apply content of a UE policy section corresponding to the UPSI to a non-public network with a same PLMN ID. That is, the PLMN ID in the identifier of the non-public network is the same as the PLMN ID corresponding to the content of the UE policy section. Here, the terminal device can receive the UPSI in a NAS message or a UE policy container.

It can be appreciated that, in an embodiment of the present disclosure, the UE policy section corresponding to the UPSI may refer to a UE policy section corresponding to a certain PLMN ID in the UE policy transmitted by the network device.

The content of the UE policy transmitted by the network device may include one or more PLMN IDs, each including one or more UPSCs and corresponding policy section content. The terminal device can use a combination of a PLMN ID and its corresponding UPSC as a UPSI.

The non-public network may include, for example, an SNPN or a CAG network.

In this embodiment, the terminal device can determine whether the identification information it receives is to be used in the non-public network or a public network based on the indication from the network device, the environment in which the identification information is received, or the content of the identification information, such that the terminal device can communicate efficiently in the corresponding network.

If it is determined that the identification information is to be used in the non-public network, then the identification information is not to be used in a public network such as a PLMN. That is, the identification information is only to be used in the non-public network.

In the embodiment of the present disclosure, the network device may transmit the identification information to the terminal device, and indicate to the terminal device whether the identification information is to be used in the non-public network. Alternatively, the terminal device may determine whether the identification information is to be used in the non-public network based on its own behavior.

The present disclosure provides three schemes for the terminal device to determine whether the identification information it receives is to be used in the non-public network. These schemes will be described below respectively.

Scheme 1

The terminal device can determine whether the identification information it receives is to be used in the non-public network based on the indication from the network device.

The network device may be, for example, a core network device, such as AMF, PCF, or the like.

Figure 5:
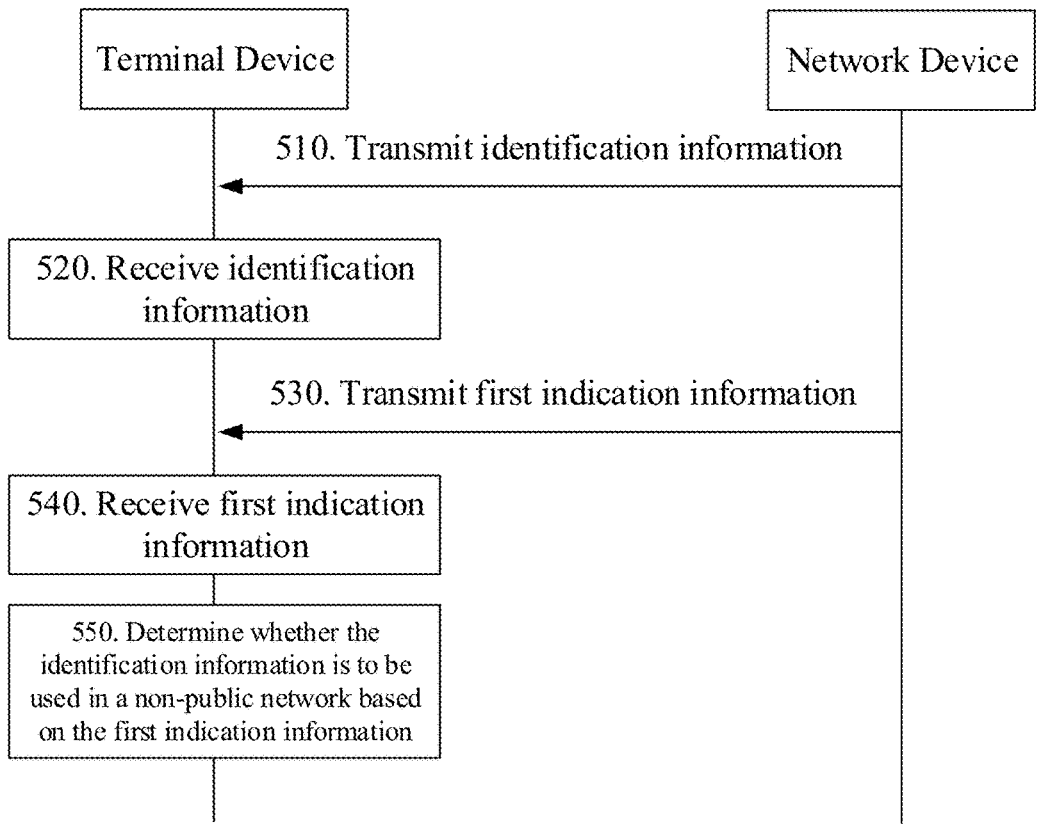
FIG. 5 is an interactive flowchart based on a possible implementation of the method shown in FIG. 4.

For example, in the embodiment shown in FIG. 5, the method can include some or all of the following steps. Here, step 520 corresponds to the above step 410, and step 550 corresponds to the above step 420.

At 510, the network device transmits identification information to a terminal device.

At 520, the terminal device receives the identification information transmitted by the network device.

At 530, the network device transmits first indication information to the terminal device.

Here, the first indication information indicates whether the identification information is to be used in a non-public network.

At 540, the terminal device receives the first indication information transmitted by the network device.

At 550, the terminal device determines whether the identification information is to be used in the non-public network based on the first indication information.

In this scheme, the network device indicates to the terminal device whether the identification information is to be used in the non-public network via the first indication information. Further, optionally, the first indication information may include a network identification code, and the identification information may be used for the non-public network corresponding to the network identification code. If the first indication information does not include the network identification code, it can be determined by default that the identification information is applicable to the non-public network where the terminal device is currently residing.

Here, the network identification code may be used to identify different non-public networks. When the non-public network is an SNPN, the network identification code may be an NID. When the non-public network is a CAG network, the network identification code may be a CAG identifier.

For example, an AMF may include the first indication information in a downlink Non-Access Stratum (NAS) message. Here, the first indication information can indicate whether the identification information included in the NAS message, such as GUTI, TAI, or UPSI, is to be used in the non-public network. Further, if the first indication information carries an NID or a CAG identifier, it means that the identification information received by the terminal device is to be used in the non-public network corresponding to the NID or the CAG identifier. If the first indication information does not carry any NID or CAG identifier, it means that the identification information is to be used in the non-public network where the terminal device is currently residing.

Scheme 2

The terminal device can determine whether the identification information it receives is to be used in the non-public network based on content of the identification information.

In an implementation, the network device may indicate to the terminal device whether the identification information is to be used in the non-public network by using a value of a first field in the identification information.

Correspondingly, the terminal device may determine whether the identification information is to be used in the non-public network based on the value of the first field in the identification information.

In other words, some specific values of the first field in the identification information can be used by non-public networks by default. When the network device indicates to the terminal device that the identification information is to be used in a non-public network, the value of the first field can be set to a specific value. After the terminal device receives the identification information, if the value of the first field therein is the specific value, it can determine that the identification information is to be used in the non-public network.

Here, the first field may include, for example, at least one of: a field carrying an AMF Region ID, a field carrying an AMF Set ID, and a field carrying a PLMN ID.

For example, it is assumed that the first field is a field carrying an AMF Region ID, or a field carrying an AMF Set ID. The non-public network is considered as a network slice. If the value of the AMF Region ID field or the AMF Set ID field in the identification information received by the terminal device is a value assigned to the network slice, the identification information is to be used in the non-public network corresponding to the value.

As another example, it is assumed that the first field is a field carrying a PLMN ID. If the value of the MCC in the PLMN ID in the identification information received by the terminal device is a specific value, e.g., MCC=999, the identification information is to be used in the non-public network.

As yet another example, if the value of the first field in the identification information received by the terminal device is a network identification code, such as NID, of a non-public network, the identification information is to be used in the non-public network.

In this embodiment, the terminal device can determine whether the identification information is applicable to the non-public network based on the value of the first field in the identification information it receives, e.g., GUTI, TAI, or UPSI.

In another implementation, the network device may indicate to the terminal device whether the identification information is to be used in the non-public network by setting the identification information to carry or not to carry a second field.

Correspondingly, the terminal device may determine whether the identification information is to be used in the non-public network based on whether the identification information carries the second field.

That is, the number of fields included in the identification information transmitted in the public network is different from the number of fields included in the identification information transmitted in the non-public network.

The second field may be, for example, a dedicated field carrying a network identification code.

In this case, when the network device indicates to the terminal device that the identification information is to be used in the non-public network, the identification information may be set to carry the second field. After the terminal device receives the identification information, if the identification information carries the second field, it can determine that the identification information is to be used in the non-public network.

Figure 6:
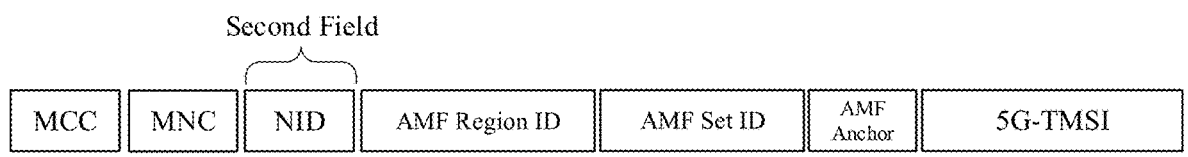
FIG. 6 is a schematic diagram showing a second field in a GUTI.
Figure 7:
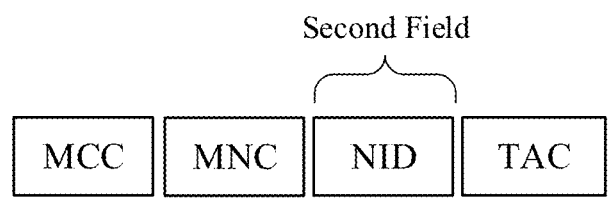
FIG. 7 is a schematic diagram showing a second field in a TAI.

For example, in the identification information such as GUTI, TAI or UPSI, a new field can be added to carry the network identification code of the non-public network. Taking an SNPN as an example, in the embodiment shown in FIG. 6, a second field can be added between the MNC field and the AMF Region ID field in the GUTI used in the SNPN to carry the NID. If there is no NID field in the GUTI received by the terminal device, it indicates that the GUTI is to be used in the PLMN. If there is an NID field in the GUTI received by the terminal device, it indicates that the GUTI is to be used in the SNPN. In the embodiment shown in FIG. 7, a second field can be added between the MNC field and the TAC field in the TAI used in the SNPN to carry an NID. If there is no NID field in the TAI received by the terminal device, it indicates that the TAI is to be used in the PLMN. If there is an NID field in the TAI received by the terminal device, it indicates that the TAI is to be used in the SNPN.

The second field may be, for example, a field carrying a PLMN ID.

In this case, when the network device indicates to the terminal device that the identification information is to be used in the non-public network, it may set the identification information not to carry the second field. After the terminal device receives the identification information, if the identification information does not carry the second field, it can determine that the identification information is to be used in the non-public network.

For example, when a network device transmits a GUTI, if the GUTI carries a PLMN ID field, it indicates that the GUTI is to be used in the public network. If the GUTI does not carry a PLMN ID field, i.e., the network device does not transmit the MCC field and the MNC field, it indicates that the GUTI is to be used in the non-public network.

As another example, when a network device transmits a TAI, if the TAI carries a PLMN ID field, it indicates that the TAI is to be used in the public network. If the TAI does not carry a PLMN ID field, i.e., the network device does not transmit the MCC field and the MNC field, it indicates that the TAI is to be used in the non-public network.

As yet another example, when the network device transmits a UE policy such as a UE policy section management sublist, each UE policy corresponds to a plurality of PLMN IDs, and each PLMN ID corresponds to a plurality of UE policy sections. The content of each UE policy section is identified by a PSC. Here, if the transmitted UE policy carries a PLMN ID field, the content of the UE policy section therein is to be used in the public network. If the UE policy does not carry a PLMN ID field, i.e., the network device does not transmit the MCC field and the MNC field, or if the value of the PLMN ID field is null or invalid, the content of the UE policy section therein is to be used in the non-public network with the same PLMN ID, i.e., the PLMN ID in the identifier of the non-public network is the same as the PLMN ID corresponding to the content of the UE policy section.

In this embodiment, the terminal device determines whether the identification information is applicable to the non-public network based on whether the GUTI, TAI, or UPSI it receives carries the second field.

Scheme 3

The terminal device can determine whether the identification information is to be used in the non-public network based on an environment in which the identification information is received.

Optionally, when the terminal device receives the identification information in a current non-public network where the terminal device is residing, the terminal device can determine that the identification information is to be used in the current non-public network.

For example, if the terminal device receives a GUTI or TAI in the current non-public network where the terminal device is residing, the GUTI or TAI is only used when accessing the current non-public network.

As another example, if the terminal device receives a UPSI in the current non-public network where the terminal device is residing, content of a UE policy section corresponding to the UPSI is applied to a non-public network with a same PLMN ID.

In addition, optionally, if the terminal device receives the identification information in the public network, the terminal device may determine that the identification information is to be used in the public network.

Further, optionally, after receiving the identification information in the current non-public network, the terminal device may associate the identification information with the non-public network, and store the association. When the terminal device leaves the non-public network, the identification information and the association can be deleted.

With the above schemes, the terminal device can determine whether the identification information it receives is to be used in the non-public network or the public network, such that the terminal device can communicate efficiently in the corresponding network. In Scheme 1, the network device transmits the first indication information to indicate the network to which the identification information is applicable. In Scheme 2, the structure of the identification information itself is changed to indicate the network to which the identification information is applicable. In Scheme 3, the terminal device determines the network to which the identification information is applicable based on its own behavior, without relying on an indication from the network device, without changing the structure of the identification information, and without adding any new message.

Optionally, the method may further include: transmitting, by the terminal device, second indication information to the network device.

The second indication information indicates that the terminal device has accessed the non-public network.

Correspondingly, the network device receives the second indication information.

The network device may determine whether the terminal device is registered to the non-public network based on the second indication information, so as to ensure that the terminal device is in a normal state.

It is to be noted that, the various embodiments described in the present disclosure and/or the technical features in each embodiment can be combined with each other arbitrarily, provided that they do not conflict with each other, and the technical solutions obtained by combination also fall within the scope of the present disclosure.

In the various embodiments of the present disclosure, the values of the sequence numbers of the above processes do not imply the order in which they are performed. The order in which each process is performed should be determined by its function and internal logic. The implementation processes of the embodiments of the present disclosure are not limited to any specific order described above.

The methods for information transmission according to the embodiments of the present disclosure have been described above in detail. The apparatuses according to the embodiments of the present disclosure will be described below with reference to FIG. 8 to FIG. 11. The technical features described in the method embodiments are applicable to the following apparatus embodiments.

Figure 8:
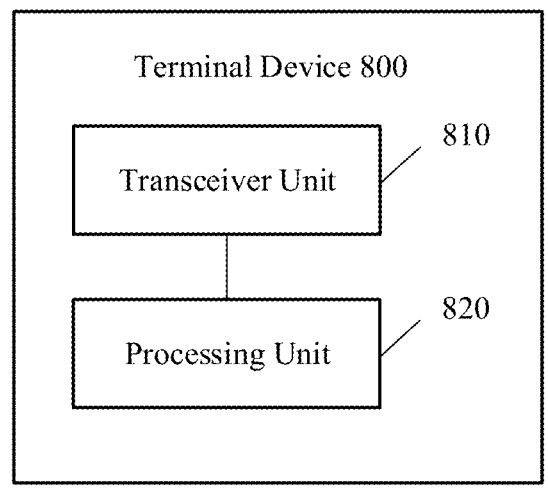
FIG. 8 is a schematic block diagram of a terminal device according to an embodiment of the present disclosure.

FIG. 8 is a schematic block diagram of a terminal device 800 according to an embodiment of the present disclosure. As shown in FIG. 8, the terminal device 800 includes: a transceiver unit 810 configured to receive identification information transmitted by a network device; and a processing unit 820 configured to determine whether the identification information is to be used in a non-public network based on an indication from the network device, an environment in which the identification information is received, or content of the identification information.

Therefore, the terminal device can determine whether the identification information it receives is to be used in the non-public network based on the indication from the network device, the environment in which the identification information is received, or the content of the identification information, such that the terminal device can communicate efficiently in the corresponding network.

Optionally, the processing unit 820 can be particularly configured to control the transceiver unit 810 to receive first indication information transmitted by the network device. The first indication information indicates whether the identification information is to be used in the non-public network.

Optionally, the first indication information can contain a network identification code, and the identification information can be used in the non-public network corresponding to the network identification code.

Optionally, the first indication information can be carried in a downlink NAS message.

Optionally, the processing unit 820 can be particularly configured to determine whether the identification information is to be used in the non-public network based on a value of a first field in the identification information; or determine whether the identification information is to be used in the non-public network based on whether the identification information carries a second field.

Optionally, the first field can include at least one of: a field carrying an Access and Mobility management Function (AMF) region identifier, a field carrying an AMF set identifier, and a field carrying a Public Land Mobile Network (PLMN) identifier.

Optionally, the second field can include at least one of: a field carrying a PLMN identifier, and a dedicated field carrying a network identification code.

Optionally, the processing unit 820 can be particularly configured to determine that the identification information is to be used in the non-public network when the value of the first field is a specific value.

Optionally, the processing unit 820 can be particularly configured to determine that the identification information is to be used in the non-public network when the identification information does not carry the second field.

Optionally, the processing unit 820 can be particularly configured to determine that the identification information is to be used in a current non-public network where the terminal device is residing, when the terminal device receives the identification information in the current non-public network.

Optionally, the processing unit 820 can be further configured to associate the identification information with the non-public network and store the association.

Optionally, the processing unit 820 can be further configured to delete the identification information when the terminal device leaves the non-public network.

Optionally, the transceiver unit 810 can be further configured to transmit second indication information to the network device, the second indication information indicating that the terminal device has accessed the non-public network.

Optionally, the identification information can include at least one of: a GUTI, a TAI, and a UPSI.

Optionally, the identification information can include the UPSI, and the processing unit 820 can be further configured to: apply, when determining that the UPSI is to be used in the non-public network, content of a UE policy section corresponding to the UPSI to a non-public network with a same PLMN ID.

Optionally, the transceiver unit 810 can be particularly configured to: receive the UPSI in a Non-Access Stratum (NAS) message or a UE policy container.

Optionally, the non-public network may include: an SNPN and/or a CAG network.

Optionally, when the non-public network is the SNPN, the network identification code can be a Network Identification (NID), and/or when the non-public network is the CAG network, the network identification code can be a CAG identifier.

It should be understood that the terminal device 800 can perform corresponding operations performed by the terminal device in the above method embodiments, and details thereof will be omitted here for simplicity.

Figure 9:
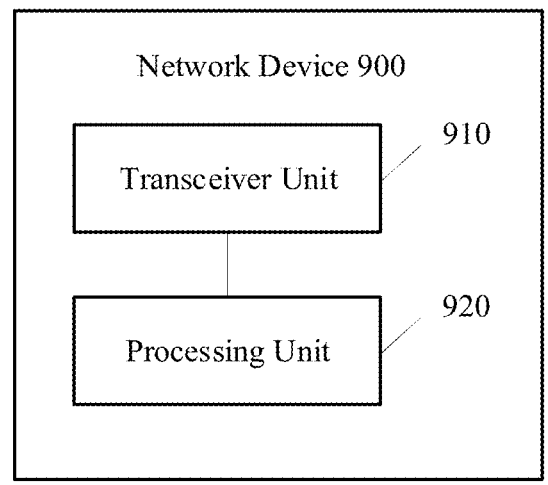
FIG. 9 is a schematic block diagram of a network device according to an embodiment of the present disclosure.

FIG. 9 is a schematic block diagram of a network device 900 according to an embodiment of the present disclosure. As shown in FIG. 9, the network device 900 includes:

a transceiver unit 910 configured to transmit identification information to a terminal device; and a processing unit 920 configured to indicate to the terminal device whether the identification information is to be used in a non-public network.

Therefore, the network device can indicate to the terminal device whether the identification information it transmits is applicable to the non-public network, such that the terminal device can identify the network to which the received identification information is applicable, so as to communicate efficiently in the corresponding network.

Optionally, the processing unit 920 can be particularly configured to control the transceiver unit 910 to transmit first indication information to the terminal device. The first indication information indicates whether the identification information is to be used in the non-public network.

Optionally, the first indication information can contain a network identification code identifying a non-public network, and the identification information can be used in the non-public network corresponding to the network identification code.

Optionally, the first indication information can be carried in a downlink NAS message.

Optionally, the processing unit 920 can be particularly configured to indicate to the terminal device whether the identification information is to be used in the non-public network by using a value of a first field in the identification information; or indicate to the terminal device whether the identification information is to be used in the non-public network by setting the identification information to carry or not to carry a second field.

Optionally, the first field can include at least one of: a field carrying an Access and Mobility management Function (AMF) region identifier, a field carrying an AMF set identifier, and a field carrying a Public Land Mobile Network (PLMN) identifier.

Optionally, the second field can include at least one of: a field carrying a PLMN identifier, and a dedicated field carrying a network identification code.

Optionally, the processing unit 920 can be particularly configured to set, when indicating to the terminal device that the identification information is to be used in the non-public network, the value of the first field to a specific value.

Optionally, the processing unit 920 can be particularly configured to set, when indicating to the terminal device that the identification information is to used in the non-public network, the identification information not to carry the second field.

Optionally, the processing unit 920 can be particularly configured to control, when indicating to the terminal device that the identification information is to be used in a current non-public network where the terminal device is residing, the transceiver unit 910 to transmit the identification information to the terminal device in the current non-public network.

Optionally, the transceiver unit 910 can be further configured to receive second indication information transmitted by the terminal device. The second indication information indicates that the terminal device has accessed the non-public network.

Optionally, the identification information may include at least one of: a GUTI, a TAI, and a UPSI.

Optionally, the non-public network can include an SNPN and/or a CAG network.

Optionally, when the non-public network is the SNPN, the network identification code can be a Network Identification (NID), and/or when the non-public network is the CAG network, the network identification code can be a CAG identifier.

It should be understood that the network device 900 can perform corresponding operations performed by the network device in the above method embodiments, and details thereof will be omitted here for simplicity.

Figure 10:
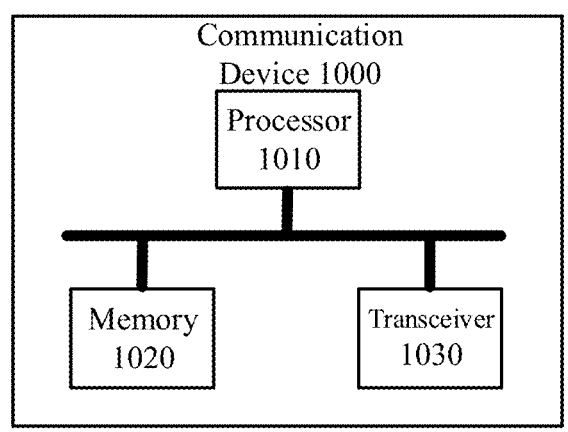
FIG. 10 is a schematic diagram showing a structure of a communication device according to an embodiment of the present disclosure.

FIG. 10 is a schematic diagram showing a structure of a communication device 1000 according to an embodiment of the present disclosure. The communication device 1000 shown in FIG. 10 includes a processor 1010, and the processor 1010 can invoke and execute a computer program from a memory to perform the method according to any of the embodiments of the present disclosure.

Optionally, as shown in FIG. 10, the communication device 1000 can further include a memory 1020. The processor 1010 can invoke and execute a computer program from the memory 1020 to perform the method according to any of the embodiments of the present disclosure.

The memory 1020 may be a separate device independent of the processor 1010, or may be integrated in the processor 1010.

Optionally, as shown in FIG. 10, the communication device 1000 can further include a transceiver 1030, and the processor 1010 can control the transceiver 1030 to communicate with other devices, and in particular to transmit information or data to other devices, or receive information or data from the other devices.

Here, the transceiver 1030 may include a transmitter and a receiver. The transceiver 1030 may further include one or more antennas.

Optionally, the communication device 1000 may specifically be a terminal device according to the embodiment of the present disclosure, and the communication device 1000 can perform corresponding procedures implemented by the terminal device in the method according to any of the embodiments of the present disclosure. Details thereof will be omitted here for simplicity.

Optionally, the communication device 1000 may specifically be a network device of the embodiment of the present disclosure, and the communication device 1000 can perform corresponding procedures implemented by the network device in the method according to any of the embodiments of the present disclosure. Details thereof will be omitted here for simplicity.

Figure 11:
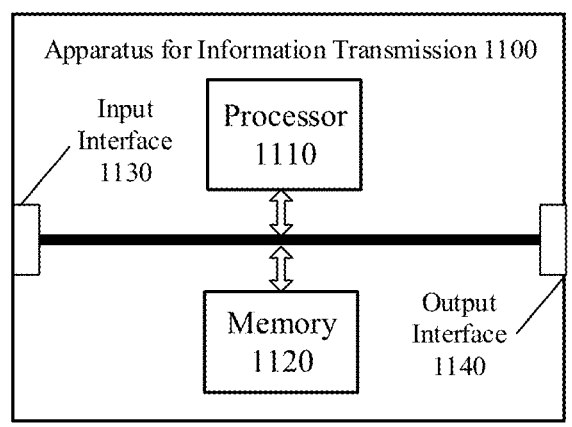
FIG. 11 is a schematic diagram showing a structure of an apparatus for information transmission according to an embodiment of the present disclosure.

FIG. 11 is a schematic diagram showing a structure of an apparatus for information transmission according to an embodiment of the present disclosure. The apparatus 1100 shown in FIG. 11 includes a processor 1110, and the processor 1110 can invoke and execute a computer program from a memory to perform the method according to any of the embodiments of the present disclosure.

Optionally, as shown in FIG. 11, the apparatus 1100 may further include a memory 1120. The processor 1110 can invoke and execute a computer program from the memory 1120 to perform the method according to any of the embodiments of the present disclosure.

The memory 1120 may be a separate device independent of the processor 1110, or may be integrated in the processor 1110.

Optionally, the apparatus 1100 may further include an input interface 1130. The processor 1110 can control the input interface 1130 to communicate with other devices or chips, and in particular to obtain information or data transmitted by the other devices or chips.

Optionally, the apparatus 1100 may further include an output interface 1140. The processor 1110 can control the output interface 1140 to communicate with other devices or chips, and in particular to output information or data to the other devices or chips.

Optionally, the apparatus 1100 may be applied to the network device in the embodiments of the present disclosure, and the apparatus 1100 can perform corresponding procedures implemented by the network device in the method according to any of the embodiments of the present disclosure. Details thereof will be omitted here for simplicity.

Optionally, the apparatus 1100 may be applied to the terminal device in the embodiments of the present disclosure, and the apparatus 1100 can perform corresponding procedures implemented by the terminal device in the method according to any of the embodiments of the present disclosure. Details thereof will be omitted here for simplicity.

Optionally, the apparatus 1100 may be a chip. The chip may be a system level chip, a system chip, a chip system, or a system-on-chip.

The processor in the embodiments of the present disclosure may be an integrated circuit chip with signal processing capability. In an implementation, the steps of the above method embodiments can be implemented by hardware integrated logic circuits in a processor or instructions in the form of software. The processor can be a general purpose processor, a Digital Signal Processor (DSP), an Application Specific Integrated Circuit (ASIC), a Field Programmable Gate Array (FPGA) or another programmable logic device, a discrete gate or transistor logic device, or a discrete hardware component. The methods, steps, and logical block diagrams disclosed in the embodiments of the present disclosure can be implemented or performed. The general purpose processor may be a microprocessor or any conventional processor. The steps of the methods disclosed in the embodiments of the present disclosure may be directly embodied as being performed and completed by a hardware decoding processor, or by a combination of hardware and software modules in the decoding processor. The software modules can be located in a known storage medium in the related art, such as a random access memory, flash memory, read-only memory, programmable read-only memory, electrically erasable programmable memory, or register. The storage medium can be located in the memory, and the processor can read information from the memory and perform the steps of the above methods in combination with its hardware.

The memory in the embodiments of the present disclosure may be a volatile memory or a non-volatile memory, or may include both volatile and non-volatile memories. Here, the non-volatile memory may be a Read-Only Memory (ROM), a Programmable ROM (PROM), an Erasable PROM (EPROM), an Electrically EPROM (EEPROM), or a flash memory. The volatile memory may be a Random Access Memory (RAM), which is used as an external cache. As illustrative, rather than limiting, examples, many forms of RAMs are available, such as Static RAM (SRAM), Dynamic RAM (DRAM), Synchronous DRAM (SDRAM), Double Data Rate SDRAM (DDR SDRAM), Enhanced SDRAM (ESDRAM), Synchlink DRAM (SLDRAM)), and Direct Rambus RAM (DR RAM).

The above memories are exemplary only, rather than limiting the present disclosure. For example, the memory in the embodiments of the present disclosure may also be a Static RAM (SRAM), a Dynamic RAM (DRAM), a Synchronous DRAM (SDRAM), a Double Data Rate SDRAM (DDR SDRAM), an Enhanced SDRAM (ESDRAM), a Synch Link DRAM (SLDRAM), or a Direct Rambus RAM (DR RAM). That is, the memory in the embodiments of the present disclosure is intended to include, but is not limited to, these and any other suitable types of memories.

Figure 12:
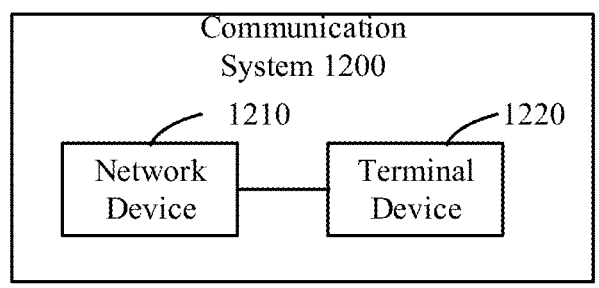
FIG. 12 is a schematic block diagram of a communication system according to an embodiment of the present disclosure.

FIG. 12 is a schematic block diagram of a communication system 1200 according to an embodiment of the present disclosure. As shown in FIG. 12, the communication system 1200 includes a network device 1210 and a terminal device 1220.

The network device 1210 is configured to: transmit identification information to the terminal device; and indicate to the terminal device whether the identification information is to be used in a non-public network.

The terminal device 1220 is configured to: receive the identification information transmitted by the network device; and determine whether the identification information is to be used in the non-public network based on an indication from the network device, an environment in which the identification information is received, or content of the identification information.

The network device 1210 can be used to implement the corresponding functions implemented by the network device in the methods shown in FIG. 4 to FIG. 7, and the network device 1210 can have the structure as shown in the communication device 900 in FIG. 9. Details thereof will be omitted here for simplicity.

The terminal device 1220 can be used to implement the corresponding functions implemented by the terminal device in the methods shown in FIG. 4 to FIG. 7, and the terminal device 1220 can have the structure as shown in the communication device 800 in FIG. 8. Details thereof will be omitted here for simplicity.

An embodiment of the present disclosure also provides a computer readable storage medium for storing a computer program.

Optionally, the computer readable storage medium can be applied to the terminal device in the embodiments of the present disclosure, and the computer program can cause a computer to perform corresponding procedures implemented by the terminal device in the method according to any of the embodiments of the present disclosure. Details thereof will be omitted here for simplicity.

Optionally, the computer readable storage medium can be applied to the network device in the embodiments of the present disclosure, and the computer program can cause a computer to perform corresponding procedures implemented by the network device in the method according to any of the embodiments of the present disclosure. Details thereof will be omitted here for simplicity.

An embodiment of the present disclosure also provides a computer program product including computer program instructions.

Optionally, the computer program product can be applied to the terminal device in the embodiment of the present disclosure, and the computer program instructions can cause a computer to perform corresponding procedures implemented by the terminal device in the method according to any of the embodiments of the present disclosure. Details thereof will be omitted here for simplicity.

Optionally, the computer program product can be applied to the network device in the embodiment of the present disclosure, and the computer program instructions can cause a computer to perform corresponding procedures implemented by the network device in the method according to any of the embodiments of the present disclosure. Details thereof will be omitted here for simplicity.

An embodiment of the present disclosure also provides a computer program.

Optionally, the computer program can be applied to the terminal device in the embodiments of the present disclosure. The computer program, when executed on a computer, can cause the computer to perform corresponding procedures implemented by the terminal device in the method according to any of the embodiments of the present disclosure. Details thereof will be omitted here for simplicity.

Optionally, the computer program can be applied to the network device in the embodiments of the present disclosure. The computer program, when executed on a computer, can cause the computer to perform corresponding procedures implemented by the network device in the method according to any of the embodiments of the present disclosure. Details thereof will be omitted here for simplicity.

The terms "system" and "network" are often used interchangeably in the embodiments of the present disclosure. The term "and/or" as used herein only represents a relationship between correlated objects, including three relationships. For example, "A and/or B" may mean A only, B only, or both A and B. In addition, the symbol "/" as used herein represents an "or" relationship between the correlated objects preceding and succeeding the symbol.

In the embodiments of the present disclosure, "B associated with (corresponding to) A" means that B is associated with A, and B can be determined from A. However, it is also to be understood that B being determined from A does not mean that B can be determined from A only, but can be determined from A and/or other information.

It can be appreciated by those of ordinary skill in the art that units and algorithm steps in the examples described in connection with the embodiments disclosed herein can be implemented in electronic hardware or any combination of computer software and electronic hardware. Whether these functions are executed by hardware or software depends on specific applications and design constraint conditions of the technical solutions. Those skilled in the art may use different methods for each specific application to implement the described functions, and such implementation is to be encompassed by the scope of this disclosure.

Those skilled in the art can clearly understand that, for the convenience and conciseness of the description, for the specific operation processes of the systems, devices, and units described above, reference can be made to the corresponding processes in the foregoing method embodiments, and details thereof will be omitted here.

In the embodiments of the present disclosure, it can be appreciated that the disclosed systems, devices, and methods may be implemented in other ways. For example, the device embodiments described above are illustrative only. For example, the divisions of the units are only divisions based on logical functions, and there may be other divisions in actual implementations. For example, more than one unit or component may be combined or integrated into another system, or some features can be ignored or omitted. In addition, the mutual coupling or direct coupling or communicative connection as shown or discussed may be indirect coupling or communicative connection between devices or units via some interfaces which may be electrical, mechanical, or in any other forms.

The units described as separate components may or may not be physically separated, and the components shown as units may or may not be physical units, that is, they may be co-located or distributed across a number of network elements. Some or all of the units may be selected according to actual needs to achieve the objects of the solutions of the embodiments.

In addition, the functional units in the embodiments of the present disclosure may be integrated into one processing unit, or alternatively be separate physical modules, or two or more units may be integrated into one unit.

When the function is implemented in the form of a software functional unit and sold or used as a standalone product, it can be stored in a computer readable storage medium. Based on this understanding, all or part of the technical solutions according to the embodiments of the present disclosure, or the part thereof that contributes to the prior art, can be embodied in the form of a software product. The computer software product may be stored in a storage medium and contain instructions to enable a computer device, such as a personal computer, a server, or a network device, etc., to perform all or part of the steps of the method described in each of the embodiments of the present disclosure. The storage medium may include a Universal Serial Bus flash drive, a mobile hard disk, a Read-Only Memory (ROM), a Random Access Memory (RAM), a magnetic disk, an optical disc, or any other medium capable of storing program codes.

While the specific embodiments of the present disclosure have been described above, the scope of the present disclosure is not limited to these embodiments. Various variants and alternatives can be made readily by those skilled in the art without departing from the scope of the present disclosure. These variants and alternatives are to be encompassed by the protection scope of present disclosure. Therefore, the protection scope of present disclosure should be defined by the claims as attached.

What is claimed is:

1. A method for information transmission, comprising:
receiving, by a terminal device, identification information transmitted by a network device, wherein the identification information comprises a Globally Unique Temporary Identifier (GUTI), the GUTI comprises a Public Land Mobile Network (PLMN) identifier (ID) and does not comprise a Network Identifier (NID); and
determining, by the terminal device, whether the identification information is to be used in a non-public network based on an environment in which the identification information is received,
wherein when the terminal device receives the GUTI in a current non-public network where the terminal device is residing, the GUTI is only used when accessing the current non-public network; and
wherein the non-public network comprises a Standalone Non-Public Network (SNPN), and the SNPN has an SNPN identifier comprising a PLMN ID and an NID.

2. The method of claim 1, further comprising:
associating, by the terminal device, the identification information with the non-public network; and storing the association by the terminal device.

3. A terminal device, comprising a processor and a memory, wherein the memory is configured to store a computer program, and the processor is configured to invoke and execute the computer program stored in the memory to:
receive identification information transmitted by a network device, wherein the identification information comprises a Globally Unique Temporary Identifier (GUTI), the GUTI comprises a Public Land Mobile Network (PLMN) identifier (ID) and does not comprise a Network Identifier (NID); and
determine whether the identification information is to be used in a non-public network based on an environment in which the identification information is received,
wherein when the terminal device receives the GUTI in a current non-public network where the terminal device is residing, the GUTI is only used when accessing the current non-public network; and
wherein the non-public network comprises a Standalone Non-Public Network (SNPN), and the SNPN has an SNPN identifier comprising a PLMN ID and an NID.

4. The terminal device of claim 3, wherein the processor is further configured to invoke and execute the computer program stored in the memory to:
associate the identification information with the non-public network; and store the association.

5. The method of claim 2, further comprising:
deleting the identification information when the terminal device leaves the non-public network.

6. The method of claim 1, further comprising:
transmitting, by the terminal device, indication information to the network device, the indication information indicating that the terminal device has accessed the non-public network.

7. The terminal device according to claim 4, wherein the processor is further configured to invoke and execute the computer program stored in the memory to:
delete the identification information when the terminal device leaves the non-public network.

8. The terminal device according to claim 3, wherein the processor is further configured to invoke and execute the computer program stored in the memory to:
transmit indication information to the network device, the indication information indicating that the terminal device has accessed the non-public network.

9. A chip, comprising a processor, wherein the processor is configured to invoke and execute a computer program from a memory to cause a device provided with the chip to:
receive identification information transmitted by a network device, wherein the identification information comprises a Globally Unique Temporary Identifier (GUTI), the GUTI comprises a Public Land Mobile Network (PLMN) identifier (ID) and does not comprise a Network Identifier (NID); and
determine whether the identification information is to be used in a non-public network based on an environment in which the identification information is received,
wherein when the terminal device receives the GUTI in a current non-public network where the terminal device is residing, the GUTI is only used when accessing the current non-public network; and
wherein the non-public network comprises a Standalone Non-Public Network (SNPN), and the SNPN has an SNPN identifier comprising a PLMN ID and an NID.

10. The chip according to claim 9, wherein the processor is configured to invoke and execute the computer program from the memory to cause the device provided with the chip to:
associate the identification information with the non-public network; and store the association.

11. The chip according to claim 10, wherein the processor is configured to invoke and execute the computer program from the memory to cause the device provided with the chip to:
delete the identification information when the terminal device leaves the non-public network.

12. The chip according to claim 9, wherein the processor is configured to invoke and execute the computer program from the memory to cause the device provided with the chip to:
transmit indication information to the network device, the indication information indicating that the terminal device has accessed the non-public network.

* * * * *